United States Patent
Pan

(10) Patent No.: US 9,578,420 B2
(45) Date of Patent: Feb. 21, 2017

(54) AUDIO CONTROL CIRCUIT CAPABLE OF PROCESSING BOTH DIGITAL AND ANALOG AUDIO SIGNALS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wei Pan, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 113 days.

(21) Appl. No.: 14/479,011

(22) Filed: Sep. 5, 2014

(65) Prior Publication Data
US 2015/0125006 A1     May 7, 2015

(30) Foreign Application Priority Data
Nov. 5, 2013 (CN) .......................... 2013 1 05402622

(51) Int. Cl.
*H02B 1/00* (2006.01)
*H04R 5/04* (2006.01)
(Continued)

(52) U.S. Cl.
CPC ................ *H04R 5/04* (2013.01); *H04H 60/04* (2013.01); *G06F 3/16* (2013.01);
(Continued)

(58) Field of Classification Search
None
See application file for complete search history.

(56) References Cited

U.S. PATENT DOCUMENTS 6,946,982 B1 *   9/2005   Mu ..................... G11B 20/1262
                                                    341/50
8,036,399 B2 *  10/2011   Chao ...................... H03F 1/305
                                                    381/120

(Continued)

FOREIGN PATENT DOCUMENTS

CN          1083639 C    4/2002
TW          201223276    6/2012
TW          I370976      8/2012

*Primary Examiner* — Tan X Dinh
(74) *Attorney, Agent, or Firm* — Zhigang Ma

(57) ABSTRACT

An audio control circuit receives analog audio signals and digital audio signals via an audio signal input interface. The audio control circuit includes an audio codec chip, a first control circuit, a first switch circuit, a second control circuit, and a second switch circuit. The first control circuit obtains the analog audio signals from the audio signal input interface and converts the analog audio signals into first control signals to control the first switch circuit turned on and off. The second control circuit obtains the digital audio signals from the audio signal input interface and converts the digital audio signals into second control signals to control the second switch circuit turned on and off. The audio codec chip receives the analog audio signals in response to the first switch turned on and receives the digital audio signals in response to the second switch turned on.

11 Claims, 1 Drawing Sheet

(51) Int. Cl.
  *H04H 60/04*   (2008.01)
  *G11B 27/10*    (2006.01)
  *G06F 3/16*     (2006.01)
  *G11B 20/10*    (2006.01)

(52) U.S. Cl.
  CPC ...... *G11B 20/10527* (2013.01); *G11B 27/105* (2013.01); *H04R 2410/03* (2013.01)

(56) References Cited

U.S. PATENT DOCUMENTS

| | | |
|---|---|---|
| 8,176,214 B2 | 5/2012 | Jones et al. |
| 8,917,882 B2 * | 12/2014 | Miao ................... H04R 1/1041 381/123 |
| 2003/0152161 A1 * | 8/2003 | Lambert ............. H03M 7/3008 375/295 |
| 2003/0219134 A1 * | 11/2003 | Su ............................ H03F 3/68 381/104 |
| 2004/0119619 A1 * | 6/2004 | Lambert ............... H03M 3/336 341/108 |
| 2004/0122541 A1 * | 6/2004 | DiSanza .............. H04R 29/004 700/94 |
| 2006/0178171 A1 * | 8/2006 | Liu .......................... H02J 7/00 455/573 |
| 2006/0187022 A1 * | 8/2006 | Dawson ................. H04B 3/542 340/538.11 |
| 2008/0013607 A1 | 1/2008 | Sim et al. |
| 2014/0112501 A1 * | 4/2014 | Yeh ........................ H04R 3/00 381/122 |

\* cited by examiner

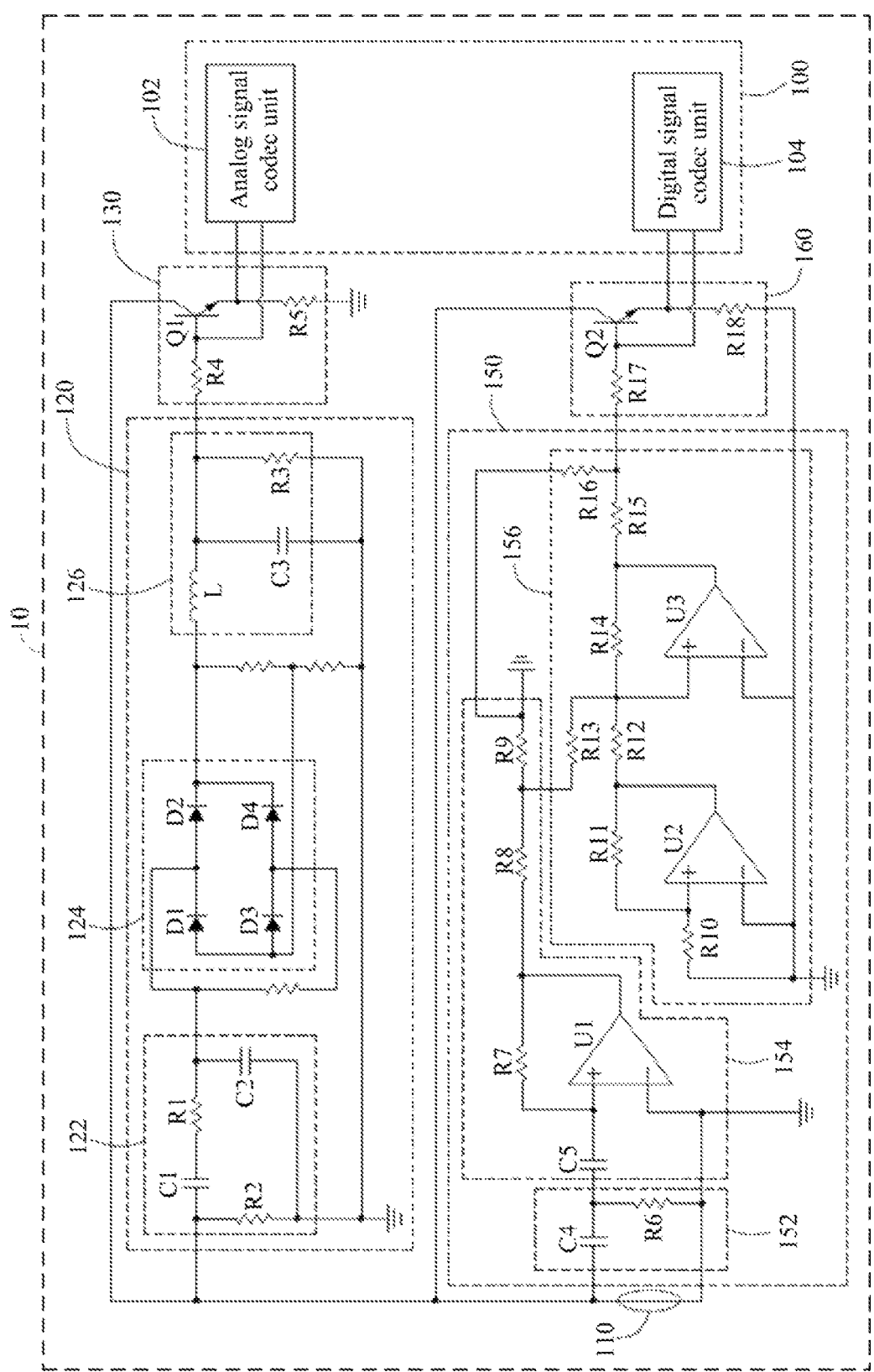

AUDIO CONTROL CIRCUIT CAPABLE OF PROCESSING BOTH DIGITAL AND ANALOG AUDIO SIGNALS

FIELD

The disclosure relates to audio circuits, and particularly to an audio control circuit that shares an interface to receive analog audio signals and digital audio signals.

BACKGROUND

In a current design, an audio device comprises an analog audio signal interface and a digital audio signal interface. The audio device receives analog audio signals via the analog audio signal interface and receives digital audio signals via the digital audio signal interface. It is challenging to design an interface that receives the analog audio signals and the digital audio signals.

BRIEF DESCRIPTION OF THE DRAWINGS

Implementations of the present technology will now be described, by way of example only, with reference to the attached FIGURES.

The FIGURE is a circuit diagram of a first embodiment of an audio control circuit.

DETAILED DESCRIPTION

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation an audio circuit.

The FIGURE illustrates a circuit diagram of an audio control circuit 10. In one embodiment, the audio control circuit 10 comprises an audio codec chip 100, an audio signal input interface 110, a first control circuit 120, a first switch circuit 130, a second control circuit 150, and a second switch circuit 160. The audio codec chip 100 comprises an analog signal codec unit 102 and a digital signal codec unit 104. The analog signal codec unit 102 encodes and decodes analog audio signals, and the digital signal codec unit 104 encodes and decodes digital audio signals. The audio signal input interface 110 receives audio signals.

In one embodiment, the audio signals comprise the analog audio signals and the digital audio signals. The audio signal input interface 110 can be set in a television (TV), a set top box (STB), or other audio devices, to decrease the number of design interfaces of the audio devices. In other embodiments, the audio signals can be the analog audio signals, or the digital audio signals.

The first control circuit 120 is coupled between the audio signal input interface 110 and the first switch circuit 130. The first control circuit 120 obtains the analog audio signals from the audio signals of the audio signal input interface 110 and converts the analog audio signals into first control signals. The first switch circuit 130 is coupled between the audio signal input interface 110 and the audio codec chip 100. The first switch circuit 130 connects the audio signal input interface 110 to, or disconnects the audio signal input interface 110 from the analog signal codec unit 102 according to the first control signals output by the first control circuit 120. The audio codec chip 100 controls the analog signal codec unit 102 receiving the analog audio signals in response to the first control signals.

In one embodiment, when the analog signal codec unit 102 receives the analog audio signals, the analog signal codec unit 102 can decode the analog audio signals and output the decoded analog audio signals to a speaker (not shown).

In one embodiment, the first control circuit 120 further comprises an analog signal obtaining unit 122, a rectifying unit 124, and a filter unit 126. The analog signal obtaining unit 122 obtains the analog audio signals which are within a predetermined frequency range from the audio signals of the audio signal input interface 110. The rectifying unit 124 rectifies the obtained analog audio signals, and the filter unit 126 filters the rectified analog audio signals to output the first control signals to the first switch circuit 130 and the analog signal codec unit 102.

In one embodiment, when the audio control circuit 10 set in different types audio devices, the predetermined frequency ranges of the analog audio signals obtained by the analog signal obtaining unit 122 are different. When the analog signal obtaining unit 122 obtains the analog audio signals to drive a loudspeaker, the predetermined frequency range of the analog audio signals is determined by a type of the loudspeaker.

The analog signal obtaining unit 122 comprises a first capacitor C1, a first resistor R1, a second capacitor C2, and a second resistor R2. A first end of the first capacitor C1 is coupled to the audio signal input interface 110, a second end of the first capacitor C1 is coupled to a first end of the first resistor R1, and a second end of the first resistor R1 is coupled to the rectifying unit 124. A first end of the second capacitor C2 is coupled to a node between the first resistor R1 and the rectifying unit 124, and a second end of the second capacitor C2 is coupled to a ground. A first end of the second resistor R2 is coupled to a node between the first capacitor C1 and the audio signal input interface 110, and a second end of the second resistor R2 is coupled to a ground. The analog signal obtaining unit 122 adjusts capacitances of the first capacitor C1 and the second capacitor C2, and resistances of the first resistor R1 and the second resistor R2 to configure the analog audio signals which are within the predetermined frequency range.

In one embodiment, the predetermined frequency range is 2 Khz-20 Khz.

The rectifying unit 124 comprises four diodes D1, D2, D3, D4, and the diodes D1, D2, D3, D4 form a full-bridge rectifying circuit.

The filter unit 126 comprises an inductor L, a third capacitor C3, and a third resistor R3. A first end of the inductor L is coupled to the rectifying unit 124, and a second end of the inductor L is coupled to the first switch circuit 130. A first end of the third capacitor C3 is coupled to a node between the inductor L and the first switch circuit 130, and a second end of the third capacitor C3 is coupled to a ground. A first end of the third resistor R3 is coupled to a node between the inductor L and the third capacitor C3, and a second end of the third resistor is coupled to a ground.

The first switch circuit 130 comprises a first switch Q1, a fourth resistor R4, and a fifth resistor R5. The first switch Q1 comprises a control terminal, a first terminal, and a second terminal. The first terminal of the first switch Q1 is coupled to the audio signal input interface 110, the second terminal of the first switch Q1 is coupled to the analog signal codec unit 102. A first end of the fourth resistor R4 is coupled to the second end of the inductor L, and a second end of the fourth resistor R4 is coupled to the control terminal of the first switch Q1 and the analog signal codec unit 102. A first end of the fifth resistor R5 is coupled to a node between the second terminal of the first switch Q1 and the analog signal codec unit 102, and a second end of the fifth resistor R5 is coupled to a ground.

The second control circuit 150 is coupled between the audio signal input interface 110 and the second switch circuit 160. The second control circuit 150 obtains the digital audio signals from the audio signals of the audio signal input interface 110 and converts the digital audio signals into second control signals. The second switch circuit 160 is coupled between the audio signal input interface 110 and the audio codec chip 100. The second switch circuit 160 connects the audio signal input interface 110 to, or disconnects the audio signal input interface 110 from the digital signal codec unit 104 according to the second control signals output by the first control circuit 120. The audio codec chip 100 controls the digital signal codec unit 104 receiving the digital audio signals in response to the second control signals. When the digital signal codec unit 104 receives the digital audio signals, the digital signal codec unit 104 decodes the digital audio signals and outputs the decoded digital audio signals.

In one embodiment, the second control circuit 150 further comprises a digital signal obtaining unit 152, an integration unit 154, and a voltage conversion unit 156. The digital signal obtaining unit 152 obtains the digital audio signals from the audio signals of the audio signal input interface 110. The integration unit 154 integrates and converts the obtained digital audio signals into direct current (DC) voltage signals.

In one embodiment, the DC voltage signals comprise positive voltage signals and negative voltage signals. The digital audio signals obtained by the integration unit 154 comprise logic 1 signals and logic 0 signals, the logic 1 signals are high level signals, and the logic 0 signals are low level signals. The integration unit 154 converts the obtained digital audio signals which are in logic 1 into positive voltage signals, and converts the obtained digital audio signals which are in logic 0 into negative voltage signals.

The voltage conversion unit 156 converts the negative voltage signals comprising in the DC voltage signals into the positive voltage signals to output the second control signals to the second switch circuit 160 and the digital signal codec unit 104.

The digital signal obtaining unit 152 comprises a fourth capacitor C4 and a sixth resistor R6. A first end of the fourth capacitor C4 is coupled to the audio signal input interface 110, a second end of the fourth capacitor C4 is coupled to a first end of the sixth resistor R6, and a second end of the sixth resistor R6 is coupled to a ground.

The integration unit 154 comprises a fifth capacitor C5, a first comparator C1, a seventh resistor R7, an eighth resistor R8, and a ninth resistor R9. A first end of the fifth capacitor C5 is coupled to a node between the fourth capacitor C4 and the sixth resistor R6. The first comparator C1 comprising a positive terminal, a negative terminal, and an output terminal. The positive terminal of the first comparator C1 is coupled to a second end of the fifth capacitor C5, the negative terminal of the first comparator C1 is coupled to a ground. A first end of the seventh resistor R7 is coupled to a node between the fifth capacitor C5 and the positive terminal of the first comparator C1, and a second end of the seventh resistor R7 is coupled to the output terminal of the first comparator C1. A first end of the eighth resistor R8 is coupled to a node between the seventh resistor R7 and the output terminal of the first comparator C1, a second end of the eighth resistor R8 is coupled to a first end of the ninth resistor R9, and a second end of the ninth resistor R9 is coupled to a ground.

The voltage conversion unit 156 comprises a second comparator C2, a third comparator C3, a tenth resistor R10, an eleventh resistor R11, a twelfth resistor R12, a thirteenth resistor R13, a fourteenth resistor R14, a fifteenth resistor R15, and a sixteenth resistor R16. A second comparator C2 comprises a positive terminal, a negative terminal, and an output terminal. The positive terminal of the second comparator C2 is coupled to a first end of the tenth resistor R10, a second end of the tenth resistor R10 is coupled to a ground, and the negative terminal of the second comparator C2 is coupled to a ground. A first end of the eleventh resistor R11 is coupled to a node between the tenth resistor R10 and the positive terminal of the second comparator C2, and a second end of the eleventh resistor R11 is coupled to the output terminal of the second comparator C2. A first end of twelfth resistor R12 is coupled to a node between the eleventh resistor R11 and the output terminal of the second comparator C2. A third comparator C3 comprises a positive terminal, a negative terminal, and an output terminal. The positive terminal of the third comparator C3 is coupled to a second end of the twelfth resistor R12, and the negative terminal of the third comparator C3 is coupled to a ground. A first end of the thirteenth resistor R13 is coupled to the positive terminal of the third comparator C3, and a second end of the thirteenth resistor R13 is coupled to a node between the eighth resistor R8 and the ninth resistor R9. A first end of the fourteenth resistor R14 is coupled to the positive terminal of the third comparator C3, and a second end of the fourteenth resistor R14 is coupled to the output terminal of the third comparator C3. A first end of the fifteenth resistor R15 is coupled to a node between the fourteenth resistor R14 and the output terminal of the third comparator C3, and a second end of the fifteenth resistor R15 is coupled to the second switch circuit 160. A first end of the sixteenth resistor R16 is coupled to a node between the fifteenth resistor R15 and the second switch circuit 160, and a second end of the sixteenth resistor R16 is coupled to a ground.

The second switch circuit 160 comprises a second switch Q2, a seventeenth resistor R17, and an eighteenth resistor R18. The second switch Q2 comprises a control terminal, a first terminal, and a second terminal. The first terminal of the second switch Q2 is coupled to the audio signal input interface 110, and the second terminal of the second switch Q2 is coupled to the digital signal codec unit 104. A first end of the seventeenth resistor R17 is coupled to a node between the fifteenth resistor R15 and the sixteenth resistor R16, and a second end of the seventeenth resistor R17 is coupled to the control terminal of the second switch Q2 and the digital signal codec unit 104. A first end of the eighteenth resistor R18 is coupled a node between the second terminal of the second switch Q2 and the digital signal codec unit 104, and a second end of the eighteenth resistor R18 is coupled to a ground.

In one embodiment, the first switch Q1 and the second switch Q2 can be an N type metal-oxide semiconductor field effect transistor (NMOSFET), a P type metal-oxide semiconductor field effect transistor (PMOSFET), an npn type transistor, and a pnp type transistor.

When the audio signal input interface 110 is coupled to an external audio signals input device (not shown), the audio signal input interface 110 receives the audio signals from the external audio signals input device. When the audio signals output by the external audio signals input device is the analog audio signals, the analog signal obtaining unit 122 obtains the analog audio signals which are within the predetermined frequency range from the audio signal input interface 110. The rectifying unit 124 rectifies the obtained analog audio signals, and the filter unit 126 filters the rectified analog audio signals to output the first control signals. The first switch Q1 is turned on and off according to the first control signals, and the audio codec chip 100 wakes the analog signal codec unit 102 according to the first control signals. The analog audio signals are transmitted to the analog signal codec unit 102 via the first switch Q1, and the analog signal codec unit 102 decodes the analog audio signals and outputs the decoded analog audio signals to a first module (not shown) which is coupled to the analog signal codec unit 102. In contrast, the second control circuit 150 has no second control signals to output, and the second switch Q2 is turned off.

When the audio signals output by the external audio signals input device is the digital audio signals, the digital signal obtaining unit 152 obtains the digital audio signals from the audio signal input interface 110. The integration unit 154 converts the obtained digital audio signals which are in logic 1 into the positive voltage signals, and converts the obtained digital audio signals which are in logic 0 into the negative voltage signals. The voltage conversion unit 156 converts the negative voltage signals into the positive voltage signals to output the second control signals. The second switch Q2 is turned on and off according to the second control signals, and the audio codec chip 100 wakes the digital signal codec unit 104 according to the second control signals. The digital audio signals are transmitted to the digital signal codec unit 104 via the second switch Q2, and the digital signal codec unit 104 decodes the digital audio signals and outputs the decoded digital audio signals to a second module (not shown) which is coupled to the digital signal codec unit 104. In contrast, the first control circuit 120 has no first control signals to output, and the first switch Q1 is turned off.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An audio control circuit comprising:
   an audio codec chip comprising an analog signal codec unit configured to encode and decode analog audio signals, and a digital signal codec unit configured to encode and decode digital audio signals;
   an audio signal input interface configured to receive audio signals;
   a first control circuit configured to obtain the analog audio signals from the audio signals and converting the analog audio signals into first control signals;
   a first switch circuit coupled between the audio codec chip and the first control circuit, the first switch circuit turned on and off according to the first control signals;
   a second control circuit configured to obtain the digital audio signals from the audio signals and converting the digital audio signals into second control signals; and
   a second switch circuit coupled between the audio codec chip and the second control circuit, the second switch circuit turned on and off according to the second control signals;
   wherein the audio codec chip configures the analog signal codec unit to receive the analog audio signals in response to the first control signals, and the audio codec chip further configures the digital signal codec unit to receive the digital audio signals in response to the second control signals; the first switch circuit comprises: a switch comprising a switch control terminal, a switch first terminal, and a switch second terminal, the switch first terminal coupled to the audio signal input interface, and the switch second terminal coupled to the analog signal codec unit; a first resistor with a first resistor first end coupled to the first control circuit, and a first resistor second end coupled to the switch control terminal; and a second resistor with a second resistor first end coupled a fourth node between the switch second terminal and the analog signal codec unit, and a second resistor second end coupled to a ground.

2. The audio control circuit of claim 1, wherein the first control circuit comprises:
   an analog signal obtaining unit configured to obtain the analog audio signals which are within a predetermined frequency range from the audio signals;
   a rectifying unit rectifying the analog audio signals; and
   a filter unit filtering the analog audio signals to output the first control signals to the first switch circuit and the audio codec chip.

3. The audio control circuit of claim 2, wherein the predetermined frequency range is 2 Khz-20 Khz.

4. The audio control circuit of claim 2, wherein the analog signal obtaining unit comprises:
   a first capacitor with a first capacitor first end coupled to the audio signal input interface;
   a first resistor with a first resistor first end coupled to a first capacitor second end, and a first resistor second end coupled to the rectifying unit;
   a second capacitor with a second capacitor first end coupled to a first node between the first resistor and the rectifying unit, and a second capacitor second end coupled to a ground; and a second resistor with a second resistor first end coupled to a second node between the first capacitor and the audio signal input interface, and a second resistor second end coupled to the ground.

5. The audio control circuit of claim 4, wherein the analog signal obtaining unit adjusts capacitances of the first capacitor and the second capacitor and resistances of the first resistor and the second resistor to configure the analog audio signals within the predetermined frequency range.

6. The audio control circuit of claim 2, wherein the filter unit comprises:
an inductor with an inductor first end coupled to the rectifying unit;
a capacitor with a capacitor first end coupled to an inductor second end of the inductor, and a capacitor second end coupled to a ground; and
a resistor with a resistor first end coupled to a third node between the inductor and the capacitor, and a resistor second end coupled to the ground.

7. The audio control circuit of claim 1, wherein the second control circuit comprises:
a digital signal obtaining unit obtaining the digital audio signals from the audio signals;
an integration unit integrating and converting the digital audio signals into direct current (DC) voltage signals; and
a voltage conversion unit converting negative voltage signals into positive voltage signals to output the second control signals to the second switch circuit and the audio codec chip.

8. The audio control circuit of claim 7, wherein the digital signal obtaining unit comprises:
a capacitor with a capacitor first end coupled to the audio signal input interface; and
a resistor with a resistor first end coupled to a capacitor second end, and a resistor second end coupled to a ground.

9. The audio control circuit of claim 7, wherein the integration unit comprises:
a capacitor with a capacitor first end coupled to the digital signal obtaining unit;
a comparator comprising a comparator positive terminal, a comparator negative terminal, and a comparator output terminal, the comparator positive terminal coupled to a capacitor second end, the comparator negative terminal coupled to a ground;
a first resistor with a first resistor first end coupled to a fifth node between the capacitor and the comparator positive terminal, and a first resistor second end coupled to the comparator output terminal;
a second resistor with a second resistor first end coupled to a sixth node between the first resistor and the comparator output terminal; and a third resistor with a third resistor first end coupled to a second resistor second end, and a third resistor second end coupled to the ground.

10. The audio control circuit of claim 7, wherein the voltage conversion unit comprises:
a first comparator comprising a first comparator positive terminal, a first comparator negative terminal, and a first comparator output terminal, the first comparator negative terminal coupled to a ground;
a first resistor with a first resistor first end coupled to the first comparator positive terminal, and a first resistor second end coupled to the ground;
a second resistor with a second resistor first end coupled to a seventh node between the first resistor and the first comparator positive terminal, and a second resistor second end coupled to the first comparator output terminal;
a third resistor with a third resistor first end coupled to a eighth node between the second resistor and the first comparator output terminal;
a second comparator comprising a second comparator positive terminal, a second comparator negative terminal, and a second comparator output terminal, the second comparator positive terminal coupled to a third resistor second end, and the second comparator negative terminal coupled to the ground;
a fourth resistor with a fourth resistor first end coupled to the second comparator positive terminal, and a fourth resistor second end coupled to the integration unit;
a fifth resistor with a fifth resistor first end coupled to a ninth node between the fourth resistor and the second comparator positive terminal, and a fifth resistor second end coupled to the second comparator output terminal;
a sixth resistor with a sixth resistor first end coupled to the second comparator output terminal, and a sixth resistor second end coupled to the second switch circuit; and
a seventh resistor with a seventh resistor first end coupled to a tenth node between the sixth resistor and the second switch circuit, and a seventh resistor second end coupled to the ground.

11. The audio control circuit of claim 1, wherein the second switch circuit comprises:
a switch comprising a switch control terminal, a switch first terminal, and a switch second terminal, the switch first terminal coupled to the audio signal input interface, and the switch second terminal coupled to the digital signal codec unit;
a first resistor with a first resistor first end coupled to the second control circuit, and a first resistor second end coupled to the switch control terminal; and
a second resistor with a second resistor first end coupled a eleventh node between the switch second terminal and the digital signal codec unit, and a second resistor second end coupled to a ground.

* * * * *